Oct. 24, 1939.    E. H. BAYHA    2,177,200
INTERNAL SIPHON GAUGE
Filed Jan. 12, 1937
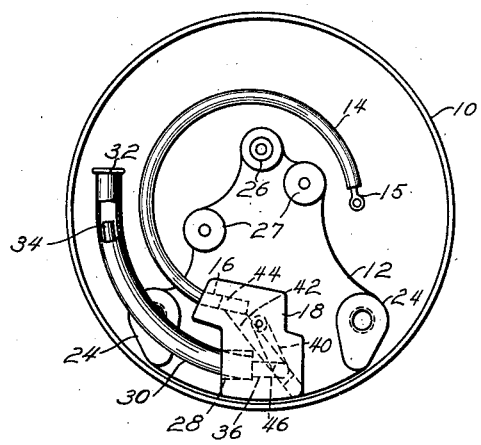
Fig. 1
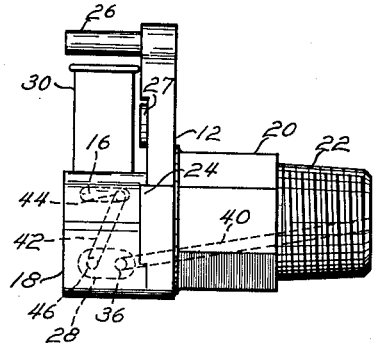
Fig. 4
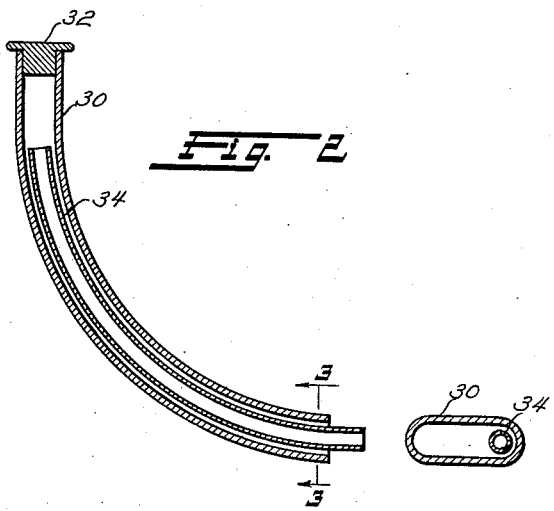
Fig. 2
Fig. 3
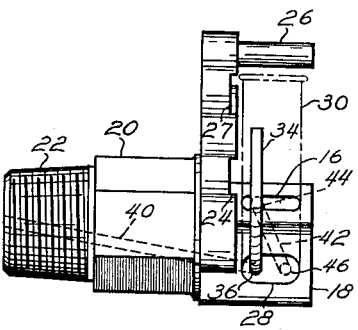
Fig. 5
Inventor
Edwin H. Bayha
By Strauch & Hoffman
Attorneys Patented Oct. 24, 1939

2,177,200

UNITED STATES PATENT OFFICE 2,177,200

INTERNAL SIPHON GAUGE

Edwin H. Bayha, Upper Darby, Pa., assignor to United States Gauge Company, New York, N. Y., a corporation of Pennsylvania Application January 12, 1937, Serial No. 120,271

2 Claims. (Cl. 73—109)

This invention relates to pressure gauges of the type wherein it is desirable or necessary to provide means for preventing the internal parts of the gauge, particularly the pressure responsive element and any fusible joints, from being subjected to excessively high temperatures.

In gauges of this type; for example, gauges employed to measure the pressures of high pressure steam, it has been the practice to provide some means accomplishing the aforementioned result and one device commonly used was the conventional "pigtail siphon" comprising a looped tube forming a condensate trap placed in the pressure line between the fluid source and the socket or base portion of the gauge. This device was positioned externally of the gauge and therefore open to several objections, principally that it was unsightly in appearance and, due to its location, exposed to damaging shocks or blows. It was hence proposed to place the siphon or condensate trap within the gauge casing thus concealing it from view and protecting it from injury.

Previous devices of this kind usually involved a great deal of extra tubing, occupying considerable space within the gauge casing and also interfering with the other parts of the gauge mechanism, as well as requiring numerous soldering operations. Furthermore they generally failed to provide a trap of adequate capacity for the desired purpose or were of insufficient surface area to promote condensation so as to insure an adequate body of liquid in the trap. The present invention provides an internal trap which obviates these difficulties and accomplishes this desired result by means of a very compact device which does not interfere with the usual gauge structure in any manner, nor does it require a large amount of extra tubing or involve numerous soldering operations. At the same time the trap is of sufficient volume and has adequate surface area to promote condensation.

A primary object, therefore, of my invention is to provide, in a pressure gauge, an improved internal siphon or trap which is efficient in operation, neat in appearance, simple and compact in construction, requires no radical or costly changes in the usual gauge structure and is readily adaptable to various existing types or designs of pressure gauges.

Another object of my invention is to provide an internal siphon or trap which is of adequate volume to insure against the entry of high temperature steam into the pressure responsive element.

A further object of my invention is to provide an improved siphon or trap which is constructed with thin walls to insure proper condensation and an adequate body of liquid therein.

Another object of my invention is to provide a siphon or trap so arranged and constructed as to provide a body of liquid adjacent to all joints formed of soft solder or other low melting point metal whereby the danger of loosening the same by contact with high temperature steam therewith is obviated.

A still further object of my invention is to provide a novel and simple arrangement of ducts within the usual base or supporting member for connecting the siphon or trap with the source of fluid pressure and with the pressure responsive element.

These and other objects will appear from a study of the following detailed description and its appended claims when taken in conjunction with the accompanying drawing, wherein:

Figure 1 is a front elevation of a gauge of conventional design embodying my improved siphon or trap and wherein the usual dial, pointer and movement mechanism have been omitted for the sake of clarity;

Figure 2 is an enlarged sectional view of my improved siphon or trap;

Figure 3 is a sectional view of Figure 2 taken on lines 3—3 of Figure 2, looking in the direction of the arrows;

Figure 4 is a side elevation of Figure 1, with the casing and Bourdon tube removed, looking from the right; and Figure 5 is an end elevation of Figure 1, with the casing and Bourdon tube removed, looking from the left and with the trap tube shown in dotted lines.

With continued reference to the drawing wherein like numerals are employed to designate like parts, and with particular reference to Figures 1 and 4:

The numeral 10 designates a casing member which is suitably secured to a socket member 12 provided with a forwardly projecting base or supporting portion 18 and a rearwardly extending boss portion 20, threaded as at 22. A Bourdon tube 14 or similar pressure responsive element is secured within a socket or opening 16 on the base portion and extends upwardly therefrom in an arcuate manner as shown in Figure 1.

The socket member 12 is provided with threaded bosses 24 to receive the casing securing screws and also with a forwardly projecting portion 26, which with the front face of the base portion 18 serves as a support for the usual dial, not shown.

Socket member 12 is also provided with bosses 27—27 designed to support the usual movement mechanism and pointer, not shown, which is operatively connected to the pressure responsive element 14 by means of the apertured element 15, the latter element also serving as a closure for the free end of the pressure responsive element.

Directly below the opening 16 is an elongated opening or socket 28, in which is secured one end of a tubular element 30 forming a portion of my improved siphon or trap. The pressure responsive element 14 and the tubular element 30 may have their lower ends secured to the base and within the sockets 16 and 28 in any suitable manner but a joint of soft solder is conveniently used for this purpose. The element 30 is constructed of relatively thin-walled tubing for reasons which will appear later and preferably is curved similarly to the pressure responsive device 14 but is of considerably larger cross-section. This element is preferably shaped as shown in Figure 3, but other shapes may of course be used. The tubular element 30 is located entirely within the casing 10 and extends upwardly therein to a point well above the openings 16 and 28. At its upper end element 30 is closed by any suitable means, such as the plug 32, which may be secured and sealed in place for example by brazing or by solder sufficiently hard to resist the temperature of the pressure fluid.

Positioned within the trap element 30 is a smaller tube 34, which extends upwardly therein to a point closely adjacent the closed end of element 30. At its lower end the tube 34 is received within a passage 36 opening into the socket 28 near the rear thereof as viewed in Figure 1 and is secured therein by soft solder or equivalent means. This passage 36 connects with a passage 40, Figure 1 which extends backwardly through the threaded boss 20. The threaded boss 20 is intended to be secured to a pipe leading from a fluid pressure source and may also serve as a supporting means for the gauge.

In front of tube 34 and the passage 36 is a vertical passage 42, plugged at its lower end as shown, and communicating adjacent its upper end with the pressure responsive device 14 through a passage 44 and the socket 16, and at its lower end with the tubular element 30 through the passage 46 and socket 28. The passages 36, 40, 42, 44 and 46 are conveniently formed by suitable drilled holes as illustrated, but they may be formed in any other suitable manner. The preferred arrangement of the passages as shown is of course variable within certain limits as long as proper connections are provided between elements 14, 30, 34 and the passage 40.

The tubular element 30 should be of sufficient size to provide a volumetric capacity, exclusive of the space occupied by the tube 34, approximately equal to that of the pressure responsive device to insure that high temperature steam will not enter the pressure responsive device. This volumetric capacity is readily variable to suit different conditions by varying the cross-sectional area or length of element 30.

The operation of my device is believed to be obvious from the foregoing but is briefly, as follows:

Steam, or other fluid under pressure, enters the gauge through the passage 40, flowing through passage 36 into the tube 34, which is preferably of small diameter and thus assists in condensation by virtue of the decrease in velocity of the steam and expansion thereof when passing therefrom into the much larger tube 30. From the upper end of tube 34 the fluid is discharged into the larger tubular element 30 where, if the fluid be steam, it condenses into water which eventually fills the tubular element 30, as well as the passages 42, 44, 46 and the Bourdon tube or pressure responsive element 14 at least up to the level of the upper end of tube 34, as shown in Figure 1. The fluid pressure is transmitted through this body of liquid to the pressure responsive element and registered by the gauge mechanism (not shown) in the usual manner. However, the large body of liquid contained within the siphon or trap, formed by the tubular element 30, passages 42, 44, 46 and the lower portion of the Bourdon tube 14, effectively prevents high temperature steam from entering into the Bourdon tube or pressure responsive device and also fully protects all of the soft soldered joints by keeping the same from contact with said high temperature steam. The thinness and large area of the wall structure of the tubular element 30 greatly enhances condensation, which is also assisted by the small diameter of tube 34, as above explained, whereby rapid and sufficient condensation of the steam is assured.

While I have shown my improved trap or siphon in a gauge of the so-called "low back connection" type it is of course obvious that the same may be embodied in any other type of gauge, whether the point of entry of the pressure fluid be through the bottom, top, or front of the gauge. It is likewise obvious that the exact position of the trap within the gauge casing be varied without changing the operation thereof or departing from the spirit of my invention.

Thus it is seen that I have provided a novel and improved trap or siphon tube arrangement for gauges which is compact and of sufficient size and proper design to function properly, contained entirely within the casing, simple in construction and requiring no costly modification of usual gauge structure.

My invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a gauge of the type described, a base portion provided with two vertically spaced elongated openings, a pressure responsive device positioned within the upper of said openings, a thin walled tubular element positioned within the other of said openings and extending upwardly adjacent to and outside of said device, said tubular element being closed at its upper end, means for securing said device and said element within their respective openings comprising a metal of relatively low melting point, a second tube positioned within said tubular element and having an open end adjacent the upper end of said element, a passage in said base portion opening into said other elongated opening and receiving the other end of said second tube, a second passage means in said base portion leading from said first named passage to the exterior of said base portion for connection with a source of fluid pressure, and a third passage in said base portion connecting said elongated openings; said tubular element, said passages and the lower portion of said pressure responsive device providing a tray for liquid condensing from said fluid, whereby said soldered joints are protected by liquid and said pressure responsive device is protected from direct contact with the pressure fluid.

2. In a gauge of the type described, a base portion; two spaced openings in said base portion; a pressure responsive tube secured within one of said openings and a second tube secured within the other of said openings, said second tube having relatively thin walls and a closed end extending upwardly adjacent to said pressure responsive tube for an appreciable distance; a third and smaller tube arranged within said second tube and extending into said last-named opening; said base portion being provided with a passage opening into said last-named opening and receiving said third tube; said passage extending to the exterior of said base portion for connection to a source of fluid under pressure; and a second passage in said base portion connecting said openings.

EDWIN H. BAYHA.